(12) United States Patent
Wang et al.

(10) Patent No.: US 11,161,276 B2
(45) Date of Patent: Nov. 2, 2021

(54) METHOD OF PREPARING FLEXIBLE DEFORMABLE PHOTONIC CRYSTAL MATERIAL FOR STRUCTURAL HEALTH MONITORING

(71) Applicant: SHANDONG UNIVERSITY OF SCIENCE AND TECHNOLOGY, Qingdao (CN)

(72) Inventors: Qing Wang, Qingdao (CN); Rui Zhang, Qingdao (CN); Xu Zheng, Qingdao (CN); Ning Wang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 237 days.

(21) Appl. No.: 16/475,866

(22) PCT Filed: Aug. 24, 2018

(86) PCT No.: PCT/CN2018/102238
§ 371 (c)(1),
(2) Date: Jul. 3, 2019

(87) PCT Pub. No.: WO2020/015051
PCT Pub. Date: Jan. 23, 2020

(65) Prior Publication Data
US 2021/0039282 A1 Feb. 11, 2021

(30) Foreign Application Priority Data
Jul. 17, 2018 (CN) .......................... 201810780675.0

(51) Int. Cl.
*B29C 33/36* (2006.01)
*B29C 33/72* (2006.01)
(Continued)

(52) U.S. Cl.
CPC .......... *B29C 33/305* (2013.01); *B29C 33/444* (2013.01); *B29C 39/36* (2013.01); *G01B 11/16* (2013.01); *B29C 33/72* (2013.01)

(58) Field of Classification Search
CPC ..... B29C 33/305; B29C 39/36; B29C 33/444; B29C 33/72; G01B 11/16
See application file for complete search history.

(56) References Cited

U.S. PATENT DOCUMENTS

2008/0041475 A1 * 2/2008 Fourkas ................ B29C 33/405
137/833

FOREIGN PATENT DOCUMENTS

WO WO-2004043664 A1 * 5/2004 .......... B29C 33/424
WO 2020015051 A1 1/2020

OTHER PUBLICATIONS

International Search Report issued in corresponding International Application No. PCT/CN2018/102238; dated Apr. 25, 2019; State Intellectual Property Office of the P.R. China, Beijing, China, 10 pgs.

(Continued)

*Primary Examiner* — Marc C Howell
*Assistant Examiner* — Debjani Roy
(74) *Attorney, Agent, or Firm* — Hauptman Ham, LLP

(57) ABSTRACT

Disclosed is a method of preparing a flexible deformable photonic crystal material for structural health monitoring, comprising the following steps: washing a grating master template; preparing and assembling a mold; obtaining an assembled mold by printing a three-dimensional mold comprising an upper die and a lower die by use of a 3D printing device and installing the grating master template on the three-dimensional mold; obtaining a polydimethylsiloxane (PDMS) one-dimensional photonic crystal film by replicating a one-dimensional grating structure of a surface of the (Continued)

grating master template by pouring PDMS into the assembled mold; finally, obtaining the PDMS one-dimensional photonic crystal film with a one-dimensional photonic crystal structure on a middle surface and protrusion structures at both ends by demolding, wherein the PDMS one-dimensional photonic crystal film is the flexible deformable photonic crystal material. A mechanochromic photonic crystal film is prepared by using a master template with a photonic crystal structure, a process is simple and easy to operate, a preparation period of a mechanochromic material is greatly shortened, and a preparation cost is reduced.

2 Claims, 3 Drawing Sheets

(51) Int. Cl.
*B29C 33/30* (2006.01)
*B29C 39/36* (2006.01)
*G01B 11/16* (2006.01)
*B29C 33/44* (2006.01)

(56) References Cited

OTHER PUBLICATIONS

Written Opinion issued in corresponding International Application No. No. PCT/CN2018/102238; dated Apr. 25, 2019; State Intellectual Property Office of the P.R. China, Beijing, China, 10 pgs.
Search Report issued is corresponding Chinese Application No. 201810780675.0; dated Mar. 25, 2019; 5 pgs.
Office Action issued is corresponding Chinese Application No. 201810780675.0; dated Apr. 2, 2019; 7 pgs.
Notice to Grant issued is corresponding Chinese Application No. 201810780675.0; dated Apr. 23, 2019; 4 pgs.

* cited by examiner

METHOD OF PREPARING FLEXIBLE DEFORMABLE PHOTONIC CRYSTAL MATERIAL FOR STRUCTURAL HEALTH MONITORING

RELATED APPLICATIONS

The present application is a National Phase of International Application Number PCT/CN2018/102238, filed Aug. 24, 2018, which claims priority to Chinese Patent Application No. 201810780675.0, filed Jul. 17, 2018.

TECHNICAL FIELD

The present disclosure belongs to the technical field of preparation and application of structural health monitoring materials, and particularly relates to a method of simply and rapidly preparing a flexible deformable photonic crystal material based on nano-molding technology.

BACKGROUND

Inspired by organisms in the nature, a self-monitoring material monitoring an injury in biological perception manner attracts wide attention of researchers. The organism may send an injury warning signal by skin bruise or wound bleed. Similarly, an engineering structure may "perceive" a position and a degree of an injury according to a colour change of a material. At present, methods of preparing biomimetic self-monitoring materials mainly include a micro-reservoir embedding method and a mechanochromic material synthesis method.

In the first method, a dye is wrapped by a reservoir such as a micro-capsule, a hollow fiber or a micro-channel and the reservoir is embedded into a material, or the reservoir is made into a damage reporting coating coated on a surface of the material. After these micro-reservoirs break along with the material, the wrapped dyes may infiltrate into cracks and voids of the material, thereby displaying a damage position of the material. This method simulates a bruise or bleed effect of an injury of an organism, so that a micro-damage of the material may be visible to naked eyes. However, a liquid released from the reservoir to the damage position may generate a void in the material, resulting in a lower mechanical strength of the material. Since the reservoir cannot be restored after breakage, the effect of the damage self-reporting will occur only once at a particular position of the material.

In the second method, a material with a mechanochromic characteristic is synthesized, so that the material changes its external colour in response to a mechanical deformation by using a functional group, an additive or a biomacromolecule, or the like. In this method, a damage position can be identified, and a damage degree can also be determined according to a colour of the material to understand a material damage evolution process. However, a process of synthesizing a mechanochromic material is complex and a preparation period is long. Further, the colours with an indication function in the above two methods are all chemical colours which are unstable in property, easy to fade, susceptible to an external environment, and will cause pollution to the environment.

In summary, the existing methods have the following technical problems: (1) the process is complex and the preparation period is long; (2) the strength of the matrix material is reduced; (3) the self-monitoring effect is limited; (4) the chemical colour of the material is unstable, easy to fade, and pollutes the environment.

SUMMARY

Based on the above technical problems, the present disclosure provides a method of preparing a flexible deformable photonic crystal material for structural health monitoring.

The following technical solution is adopted in the present disclosure.

The method of preparing a flexible deformable photonic crystal material for structural health monitoring includes the following steps.

At step a, a grating master template is washed.

The grating master template is taken out from a protective vessel. A surface of the grating master template is firstly washed with anhydrous ethanol, then washed with pure water, and finally blow-dried with a nitrogen gas. And then the grating master template is placed with a grating structure facing upward into a clean culture vessel for subsequent use.

At step b, a mold is prepared and assembled.

At step b1, the mold is prepared and washed.

A three-dimensional mold is printed out by using a 3D printing device. The three-dimensional mold includes an upper die and a lower die, the upper die is of a hollow square frame structure, the lower die includes a rectangular bottom plate, the rectangular bottom plate is provided with a first strip-shaped protrusion and a second strip-shaped protrusion which are both arranged along a width direction of the rectangular bottom plate and equal in height, and the rectangular bottom plate, the first strip-shaped protrusion and the second strip-shaped protrusion are integrally designed; a side frame height of the square frame is greater than the heights of the first strip-shaped protrusion and the second strip-shaped protrusion.

Before the mold is assembled, two portions, i.e., the upper die and the lower die of the mold are firstly washed thoroughly with anhydrous ethanol respectively, and then blow-dried with the nitrogen gas and placed in a clean culture vessel for subsequent use.

At step b2, the mold and the grating master template are assembled.

Firstly, the washed upper die, the washed lower die and the washed grating master template are taken out for subsequent use; then, the grating master template is installed between the first strip-shaped protrusion and the second strip-shaped protrusion of the lower die; finally, the assembled mold is obtained for subsequent use by clamping the upper die at outer sides of the first strip-shaped protrusion and the second strip-shaped protrusion of the lower die and fixing the upper die and the lower die together; in the assembled mold, a top surface height of the grating master template is greater than top surface heights of the first strip-shaped protrusion and the second strip-shaped protrusion of the lower die and less than a top surface height of the upper die.

At step c, a polydimethylsiloxane (PDMS) one-dimensional photonic crystal film is molded.

The PDMS one-dimensional photonic crystal film is obtained by replicating a one-dimensional grating structure of the surface of the grating master template by pouring the PDMS into the assembled mold. The molding process mainly includes the following three steps.

At step c1, the PDMS is prepared and poured.

At step c1.1, a pre-polymer A and a crosslinker B of the PDMS are poured into a plastic beaker at a weight ratio of 20:1.

At step c1.2, the plastic beaker holding the PDMS is placed in a defoaming mixer and mixed uniformly with extra bubbles in the PDMS removed.

At step c1.3, the assembled mold is flatly placed on a horizontal test stand, a particular volume of PDMS is poured onto the surface of the grating master template by a pipette so that the PDMS can be fully filled in a groove of the assembled mold and spread on the surface of the grating master template due to its own good fluidity, the whole assembled mold is left for 15 minutes, and it can be observed that the PDMS forms a uniform and flat surface for curing.

At step c2, heat curing molding is performed for the PDMS.

At step c2.1, the assembled mold poured with the PDMS is flatly placed in a vacuum dryer, sealed up and then vacuumized for 15 minutes to remove bubbles generated due to flow in the PDMS and then, taken out.

At step c2.2, the assembled mold poured with the PDMS is then flatly placed in a blast drying box to perform heat curing at 80° C. for 20 minutes, and then, the assembled mold is taken out and cooled for 10 minutes for demolding.

At step d, the PDMS one-dimensional photonic crystal film is demolded.

Firstly, the cured PDMS film is gently peeled off from four side walls of the mold with pointed tweezers or a knife blade; then, two portion structures, i.e., the upper die and the lower die of the mold are separated; finally, the PDMS one-dimensional photonic crystal film with a one-dimensional photonic crystal structure on a middle surface and a protrusion structure at both ends is obtained by peeling off the whole PDMS film from the mold with the tweezers, where the PDMS one-dimensional photonic crystal film is the flexible deformable photonic crystal material.

In the present disclosure, the method of obtaining the PDMS one-dimensional photonic crystal film, i.e., the flexible deformable photonic crystal material by replicating the one-dimensional grating structure of the surface of the grating master template by pouring PDMS into the self-designed assembled mold by taking the grating master plate with the photonic crystal structure as a matrix and the PDMS as a body of the photonic crystal material has advantages of simple operation of process, much shorter preparation period of the mechanochromic material, and lower preparation cost and so on. The prepared PDMS one-dimensional photonic crystal film is an independent self-monitoring system which does not reduce the strength of the matrix material, is not subjected to time limit and has a repeatable self-monitoring effect.

It is to be noted that the selection of polydimethylsiloxane (PDMS) as the body of the photonic crystal material is one of the major innovation points of the present disclosure. Prior to the present application, the inventor also proposed a series of applications relating to a method of preparing a mechano-responsive photonic crystal material, in which tedious steps of multi-step transfer printing are mainly adopted. Although the PDMS is also adopted, a soft dielectric characteristic of the PDMS is used, that is, the PDMS is used as a secondary template for transfer-printing a photonic crystal structure on a quartz master template without comprehensively considering influences of a refractivity and a micro-structure on a structural colour effect. The PDMS photonic crystal film of the present disclosure is a single-material photonic crystal film with a mechanochromic function obtained after comprehensively considering the refractivity of the material and a photonic crystal micro-sawtooth structure. However, the applicability of the PDMS material for preparing a single-material photonic crystal film with a mechanochromic function due to its characteristic such as refractivity is not disclosed in the prior art.

In addition, when the PDMS one-dimensional photonic crystal film is prepared, the adopted three-dimensional mold may also be self-designed, and the PDMS one-dimensional photonic crystal film with the one-dimensional photonic crystal structure on the middle surface and the protrusion structure at both ends may be obtained after the PDMS is poured and molded, where the protrusion structures integrally formed at both ends facilitate clamping and fixing the PDMS one-dimensional photonic crystal film during structural health monitoring.

To ensure a precision and a monitoring effect of the PDMS one-dimensional photonic crystal film prepared in the present disclosure, a PDMS preparation condition and a PDMS heat curing molding condition, such as time of controlling sealing, drying and vacuumizing, and heat curing temperature and time are also selected.

As a preferred example of the present disclosure, a round hole for assisting in demolding is arranged in the center of the rectangular bottom plate of the lower die and between the first strip-shaped protrusion and the second strip-shaped protrusion of the lower die, so that the molded PDMS one-dimensional photonic crystal film is released from the three-dimensional mold more conveniently and the damage of the PDMS film is avoided as possible.

As a preferred example of the present disclosure, at step c1.2, the mixing time of the defoaming mixer is two minutes, that is, one minute of forward rotation is firstly performed and then one minute of reverse rotation is performed. In this case, it may be further ensured that extra bubbles in the PDMS can be completely removed while two compositions A and B of the PDMS are mixed fully and uniformly.

The present disclosure may also provide another method of preparing a flexible deformable photonic crystal material for structural health monitoring. Preparation steps of the method are basically same as the above preparation steps with a difference in that: the pre-polymer A and the cross-linker B of the PDMS are poured into the plastic beaker at a weight ratio of 10:1 and uniformly mixed.

By comparing elastic moduli of photonic crystal films with different grating structure directions, it can be known that a PDMS photonic crystal film having a transverse grating is more flexible than a PDMS photonic crystal film having a vertical grating. By comparing elastic moduli of photonic crystal films with different PDMS mixture ratios, it can be known that a PDMS photonic crystal film with a mixture ratio of 20:1 is more flexible than a PDMS photonic crystal film with a mixture ratio of 10:1.

The present disclosure also provides a flexible deformable photonic crystal material for structural health monitoring. The photonic crystal material is processed with PDMS and includes a planar film, a protrusion facilitating clamping and fixing is arranged at both ends of the planar film respectively, and a one-dimensional photonic crystal structure is arranged on a middle surface of the planar film. The flexible deformable photonic crystal material may be specifically prepared by the above preparation method.

The flexible deformable photonic crystal material may be applied to the fields of sensing, detection, and the like, is particularly applicable to structural health monitoring in the fields such as geotechnical engineering, structural engineering, disaster prevention and reduction engineering, and protection engineering, and thus may realize intelligent sensing, disaster detection and visual monitoring.

Compared with the prior art, beneficial effects of the present disclosure are described below.

1. The mechanochromic photonic crystal film is prepared by using a master template with a photonic crystal structure, the process is simple and easy to operate, the preparation period of the mechanochromic material is significantly shortened, and the preparation cost is reduced.

2. The mechanochromic photonic crystal film prepared based on the nano-molding technology is an independent self-monitoring system that does not reduce the strength of the matrix material.

3. The mechanochromic characteristic of the photonic crystal film prepared based on the nano-molding technology is not subjected to time limit and has a repeatable self-monitoring effect.

4. A display colour of the mechanochromic photonic crystal film prepared based on the nano-molding technology belongs to a structural colour which is more stable, faster, and more environment friendly, compared with those of traditional processes such as a micro-reservoir embedding method and a mechanochromic material synthesis method. Further, the preparation method features simpler operation, better repeatability and higher fabrication precision.

BRIEF DESCRIPTION OF THE DRAWINGS

The present disclosure is further described below in combination with accompanying drawings and specific examples.

DETAILED DESCRIPTION OF THE EMBODIMENTS

Figure 1:
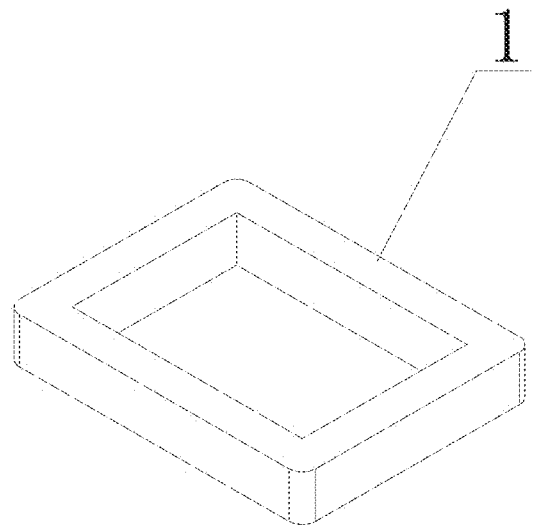
FIG. 1 is a schematic diagram illustrating a structure of an upper die of a three-dimensional mold according to an example of the present disclosure.
Figure 2:
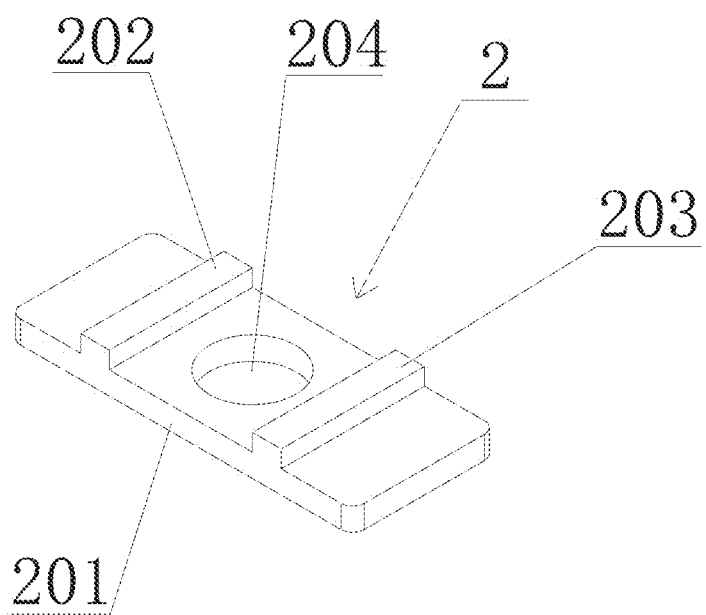
FIG. 2 is a schematic diagram illustrating a structure of a lower die of a three-dimensional mold according to an example of the present disclosure.
Figure 3:
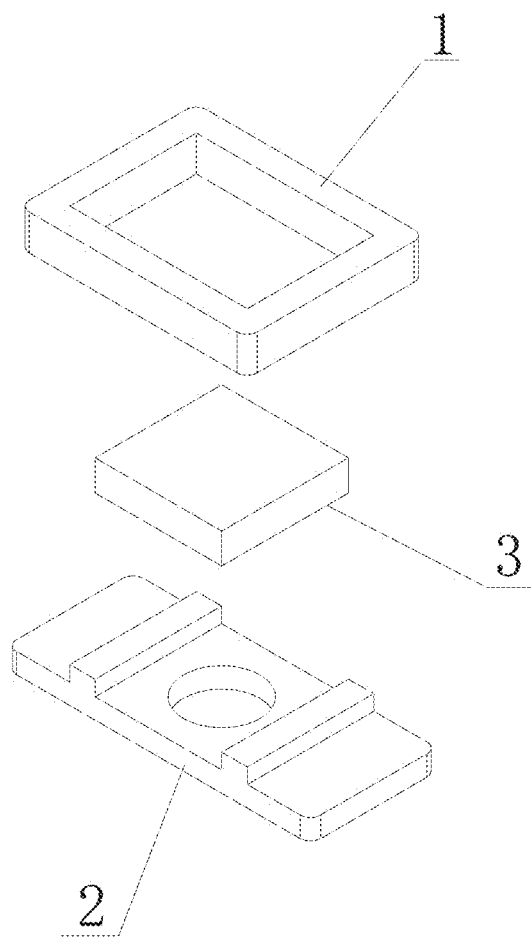
FIG. 3 is an exploded view illustrating an assembled mold according to an example of the present disclosure.
Figure 4:
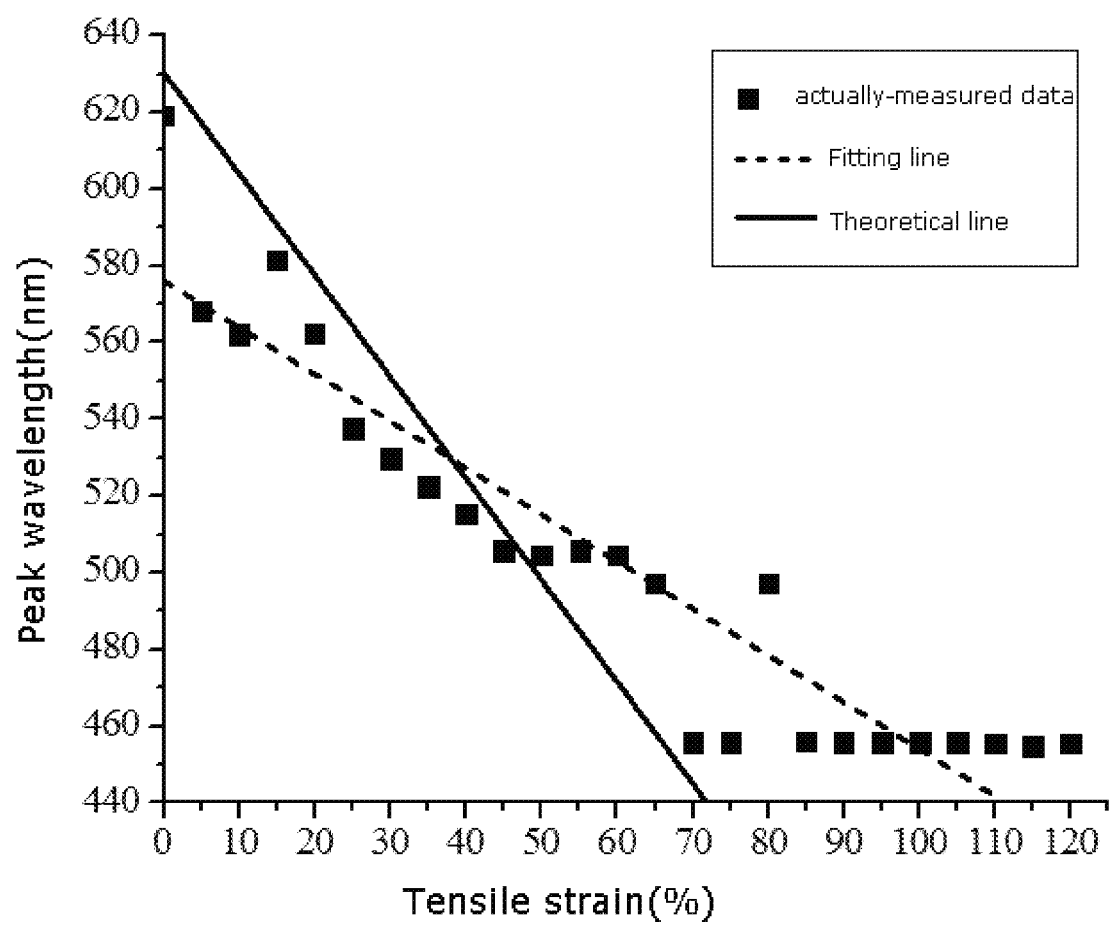
FIG. 4 illustrates a theoretically-calculated peak wavelength-tensile strain straight line graph and an actually-measured peak wavelength-tensile strain straight line graph for a PDMS photonic crystal film with a mixture ratio of 20:1 when a tensile strain parallel to a photonic crystal structure direction increases according to an example of the present disclosure.

The present disclosure provides a photonic crystal material with a self-monitoring function prepared based on a nano-molding technology. A mechanochromic photonic crystal which is simple in process, short in preparation period, does not affect a strength of a matrix material, has a stable self-monitoring effect, and is environment-friendly and fast is prepared. In the present disclosure, a rigid template with a nanoscale pattern is used as a master template, an assembled model prepared by 3D printing is used as a mold, a mechano-responsive elastic polymer is used as a molding material, a nanoscale periodic structure is obtained by transfer-printing the pattern on the master template into the molding material based on nano-molding technology, and then, the mechanochromic photonic crystal with a clamping structure of both ends and a biomimetic self-monitoring function is obtained by demolding.

The mechanochromic photonic crystal may change a lattice constant under an action of an external force, resulting in a responsive change of a colour of the prepared film pattern. Such photonic crystal may provide a colour change identifiable by naked eyes of people, and may also realize intelligent display caused by a change of the external force, thereby having a wide application prospect in the fields such as sensing and detection. The photonic crystal is particularly applicable to structural health monitoring in the fields such as geotechnical engineering, structural engineering, disaster prevention and reduction engineering and protection engineering, and thus may realize intelligent sensing, disaster detection and visual monitoring.

In the present disclosure, a mechanochromic photonic crystal with a biomimetic self-monitoring function is prepared based on nano-molding technology through the following specific steps.

At step 1, a grating master template is washed.

The grating master template is taken out from a protective vessel, a surface of the grating master template is repeatedly washed with anhydrous ethanol, then washed with ultrapure water, and finally blow-dried with a nitrogen gas, and then placed with the grating structure facing upward into a clean culture vessel for subsequent use.

The grating master template can exhibit different structural colours at different viewing angles, and each structural colour has high purity, high brightness, and good colour rendering quality.

At step 2, a mold is prepared and assembled.

At step 2.1, the mold is prepared and washed.

A pre-designed three-dimensional mold model is printed and molded by using a 3D printing device, the printed and molded three-dimensional mold includes an upper die 1 and a lower die 2, the upper die 1 is of a hollow square frame structure, the lower die 2 includes a rectangular bottom plate 201, the rectangular bottom plate 201 is provided with a first strip-shaped protrusion 202 and a second strip-shaped protrusion 203 which are both arranged along a width direction of the rectangular bottom plate and equal in height, and the rectangular bottom plate 201, the first strip-shaped protrusion 202 and the second strip-shaped protrusion 203 are integrally designed. A side frame height of the square frame is greater than the heights of the first strip-shaped protrusion and the second strip-shaped protrusion. A round hole 204 for assisting in demolding is arranged in the center of the rectangular bottom plate of the lower die and between the first strip-shaped protrusion and the second strip-shaped protrusion of the lower die. During use, the upper die and the lower die are assembled together, and a grating master template 3 is fixed therebetween. The round hole in the center of the lower die (a lower half part of the mold) can assist in demolding, and the protrusion structures (the first strip-shaped protrusion 202 and the second strip-shaped protrusion 203) at both sides can fix the grating master template and the upper die.

Before the mold is assembled, two portions, i.e., the upper die and the lower die of the mold are firstly washed thoroughly with anhydrous ethanol respectively, and then blow-dried with nitrogen gas and placed in a clean culture vessel for subsequent use.

At step 2.2, the mold and the grating master template are assembled.

Firstly, the washed upper die, the washed lower die and the washed grating master template are taken out for subsequent use; then, the grating master template is installed between the first strip-shaped protrusion and the second strip-shaped protrusion of the lower die; finally, the assembled mold is obtained for subsequent use by clamping the upper die at outer sides of the first strip-shaped protrusion and the second strip-shaped protrusion of the lower die and fixing the upper die and the lower die together. In the assembled mold, a top surface height of the grating master template is greater than top surface heights of the first strip-shaped protrusion and the second strip-shaped protrusion of the lower die and less than a top surface height of the upper die.

At step 3, a polydimethylsiloxane (PDMS) one-dimensional photonic crystal film is molded.

The PDMS one-dimensional photonic crystal film is obtained by replicating a one-dimensional grating structure, i.e., a one-dimensional photonic crystal structure of the surface of the grating master template by pouring PDMS into the assembled mold, and a molding process thereof mainly includes the following three steps.

At step 3.1, the PDMS is prepared and poured.

At step (1), a plastic beaker is placed on an electronic balance, a display screen of the electronic balance is then cleared to zero, and then, a pre-polymer (A) and a crosslinker (B) of the PDMS are poured into the plastic beaker at a weight ratio of 10:1 (or 20:1).

At step (2), the plastic beaker holding the PDMS is placed in a defoaming mixer and mixed for two minutes, including one minute of forward rotation and one minute of reverse rotation, to ensure that extra bubbles in the PDMS can be removed while two compositions A and B of the PDMS are mixed fully and uniformly.

At step (3), the assembled mold is flatly placed on a horizontal test stand, a particular volume of PDMS is poured onto the surface of the grating master template with a pipette so that the PDMS can be fully filled into a groove of the assembled mold and spread on the surface of the grating master template due to its own good fluidity, the whole assembled mold is left for 15 minutes, and it can be observed that the PDMS forms a uniform and flat surface for curing.

The PDMS includes two compositions: a pre-polymer A and a crosslinker B (the pre-polymer A and the crosslinker B may be directly purchased from the market and then prepared in a proportion). Components of the pre-polymer A mainly are a poly (dimethyl-methylvinylsiloxane) pre-polymer and a trace amount of platinum catalyst, and components of the crosslinker B are a pre-polymer having a vinyl side chain and a crosslinker poly(dimethyl-methylhydrogenosiloxane). By mixing the above two compositions, hydrosilylation reaction occurs between the vinyl and a silicon-hydrogen bond, thereby forming a three-dimensional grid structure. Mechanical property of the PDMS may be controlled by controlling a composition proportion of the pre-polymer A and the crosslinker B.

At step 3.2, heat curing molding is performed for the PDMS.

At step (1), the assembled mold poured with the PDMS is flatly placed into a vacuum dryer, sealed up and vacuumized for 15 minutes to remove bubbles in the PDMS generated due to flow, and then taken out.

At step (2), the assembled mold poured with the PDMS is flatly placed into a blast drying box to perform heat curing at 80° C. for 20 minutes, and then, taken out and cooled for 10 minutes for subsequent demolding.

At step 4, the PDMS one-dimensional photonic crystal film is demolded.

At step 4.1, the cured and molded PDMS film is gently peeled off from four side walls of the mold with pointed tweezers or a knife blade.

At step 4.2, two portion structures, i.e., the upper die and the lower die of the mold are separated. It is to be noted that it is required to avoid damaging the PDMS film in a mold separating process.

At step 4.3, the PDMS one-dimensional photonic crystal film, i.e., the flexible deformable photonic crystal material with a one-dimensional photonic crystal structure on a middle surface and protrusion structures at both ends is obtained by peeling off the whole PDMS film from the mold with the tweezers.

It is found in an experiment of the mechanochromic characteristic of the PDMS one-dimensional photonic crystal film that a structural colour of the PDMS photonic crystal film with a mixture ratio of 20:1 changes as follows every time a tensile strain parallel to a photonic crystal structure direction increases by 5%.

When the tensile strain gradually increases, the structural colour of the photonic crystal film gradually changes from red to orange, yellow, green and cyan, and finally to blue, and a range of the tensile strain corresponding to blue is the largest, smaller for green, and the smallest for orange, presenting obvious differences therebetween. When the structural colour changes to blue, a phenomenon that the distribution of the structural colour is obviously nonuniform occurs after the tensile strain exceeds 20%. Specifically, the structural colour in a middle portion of the film has more tendency to blue compared with the surrounding structural colour, and the contrast is not sharp; a small amount of red color is distributed at both upper and lower ends of the film.

A theoretically-calculated peak wavelength-tensile strain straight line graph and an actually-measured peak wavelength-tensile strain straight line graph for a PDMS photonic crystal film with a mixture ratio of 20:1 when a tensile strain parallel to a photonic crystal structure direction increases are as shown in FIG. 7. It is found by comparison that a theoretical line and a fitting line in FIG. 7 are relatively similar, thereby proving rationality and applicability of experimental results and laying a foundation for application of the photonic crystal film in visual strain sensing.

The invention claimed is:

1. A method of preparing a flexible deformable photonic crystal material for structural health monitoring, comprising:
    at step a, washing a grating master template,
    wherein the grating master template is taken out from a protective vessel, a surface of the grating master template is firstly washed with anhydrous ethanol, then washed with pure water, and finally blow-dried with nitrogen gas, and the grating master template is placed with a grating structure facing upward into a clean culture vessel for subsequent use;
    at step b, preparing and assembling a mold;
    at step b1, preparing and washing the mold,
    wherein a three-dimensional mold is printed out by using a 3D printing device, the three-dimensional mold comprises an upper die and a lower die, the upper die is of a hollow square frame structure, the lower die comprises a rectangular bottom plate, the rectangular bottom plate is provided with a first strip-shaped protrusion and a second strip-shaped protrusion which are both arranged along a width direction of the rectangular bottom plate and equal in height, and the rectangular bottom plate, the first strip-shaped protrusion and the second strip-shaped protrusion are integrally designed;
    a side frame height of the square frame is greater than the heights of the first strip-shaped protrusion and the second strip-shaped protrusion;

before the mold is assembled, two portions, i.e., the upper die and the lower die of the mold are firstly washed thoroughly with anhydrous ethanol respectively, and then blow-dried with nitrogen gas and placed into a clean culture vessel for subsequent use; and at step b2, assembling the mold and the grating master template, wherein firstly, the washed upper die, the washed lower die and the washed grating master template are taken out for subsequent use; then, the grating master template is installed between the first strip-shaped protrusion and the second strip-shaped protrusion of the lower die; finally, the assembled mold is obtained for subsequent use by clamping the upper die at outer sides of the first strip-shaped protrusion and the second strip-shaped protrusion of the lower die and fixing the upper die and the lower die together; in the assembled mold, a top surface height of the grating master template is greater than top surface heights of the first strip-shaped protrusion and the second strip-shaped protrusion of the lower die and less than a top surface height of the upper die;

at step c, molding a polydimethylsiloxane (PDMS) one-dimensional photonic crystal film, wherein the PDMS one-dimensional photonic crystal film is obtained by replicating a one-dimensional grating structure of the surface of the grating master template by pouring PDMS into the assembled mold, and a molding process mainly comprises:

at step c1, preparing and pouring the PDMS;

at step c1.1, pouring a pre-polymer A and a crosslinker B of the PDMS into a plastic beaker at a weight ratio of 20:1;

at step c1.2, placing the plastic beaker holding the PDMS in a defoaming mixer for uniformly mixing and removing bubbles in the PDMS; and at step c1.3, flatly placing the assembled mold on a horizontal test stand, pouring a particular volume of PDMS onto the surface of the grating master template with a pipette to allow the PDMS to be fully filled into a groove of the assembled mold and spread on the surface of the grating master template, leaving the whole assembled mold for 15 minutes for curing; and at step c2, performing heat curing and molding for the PDMS;

at step c2.1, flatly placing the assembled mold poured with the PDMS in a vacuum dryer, sealing up and vacuumizing the dryer for 15 minutes to remove bubbles in the PDMS generated due to flow, and then, taking out the assembled mold; and at step c2.2, flatly placing the assembled mold poured with the PDMS into a blast drying box, performing heat curing at 80° C. for 20 minutes, and then, taking out the assembled mold and cooling the assembled mold for 10 minutes for subsequent demolding; and at step d, demolding the PDMS one-dimensional photonic crystal film;

wherein firstly, the cured and molded PDMS film is peeled off from four side walls of the mold with pointed tweezers or a knife blade; then, two portion structures, i.e., the upper die and the lower die of the mold are separated; finally, the PDMS one-dimensional photonic crystal film with a one-dimensional photonic crystal structure on a middle surface and protrusion structures at both ends is obtained by peeling off the whole PDMS film from the mold with the tweezers, wherein the PDMS one-dimensional photonic crystal film is the flexible deformable photonic crystal material.

2. The method according to claim 1, wherein a round hole for assisting in demolding is arranged in the center of the rectangular bottom plate of the lower die and between the first strip-shaped protrusion and the second strip-shaped protrusion of the lower die.

* * * * *